(12) United States Patent
Fujiwara et al.

(10) Patent No.: US 7,895,908 B2
(45) Date of Patent: Mar. 1, 2011

(54) LOAD DETECTING DEVICE

(75) Inventors: Noboru Fujiwara, Toyota (JP); Akira Matsuura, Osaka (JP)

(73) Assignees: Toyoda Iron Works Co., Ltd., Toyota-shi, Aichi-ken (JP); Matsushita Electric Industrial Co., Ltd., Kadoma-shi, Osaka (JP)

( * ) Notice: Subject to any disclaimer, the term of this patent is extended or adjusted under 35 U.S.C. 154(b) by 0 days.

(21) Appl. No.: 11/546,386

(22) Filed: Oct. 12, 2006

(65) Prior Publication Data

US 2008/0060452 A1    Mar. 13, 2008

(30) Foreign Application Priority Data

Sep. 7, 2006    (JP) .................................. 2006-243455

(51) Int. Cl.
*G01L 1/04*      (2006.01)

(52) U.S. Cl. .................. 73/862.627; 73/763; 73/862.637

(58) Field of Classification Search ............. 73/862.381, 73/862.624, 862.637, 862.636, 763, 862.621, 73/862.625, 862.627

See application file for complete search history.

(56) References Cited

U.S. PATENT DOCUMENTS

| | | | |
|---|---|---|---|
| 4,493,220 A | | 1/1985 | Carignan et al. |
| 4,912,984 A | | 4/1990 | McMennamy et al. |
| 5,339,696 A | * | 8/1994 | Carignan ................. 73/862.041 |
| 6,931,947 B2 | * | 8/2005 | Schulze et al. ........... 73/862.381 |
| 7,263,895 B2 | * | 9/2007 | Nagasaka et al. ................ 73/777 |
| 7,481,123 B2 | * | 1/2009 | Fujiwara et al. ......... 73/862.627 |
| 2008/0110289 A1 | * | 5/2008 | Fujiwara ......................... 74/512 |
| 2008/0223171 A1 | * | 9/2008 | Fujiwara et al. ................ 74/512 |
| 2008/0250894 A1 | * | 10/2008 | Fujiwara ......................... 74/514 |
| 2008/0307920 A1 | * | 12/2008 | Fujiwara ......................... 74/512 |

FOREIGN PATENT DOCUMENTS

| | | |
|---|---|---|
| DE | 33 06 729 | 8/1984 |
| DE | 4332588 A1 * | 3/1995 |
| DE | 100 07 841 | 9/2001 |
| JP | 4-85241 U | 7/1992 |
| JP | 6-207866 | 7/1994 |
| JP | 08122178 A * | 5/1996 |
| JP | 10-009368 A | 6/1996 |
| JP | 2005-49260 | 2/2005 |
| WO | WO 03/073057 | 9/2003 |

OTHER PUBLICATIONS

European Search Report dated Apr. 6, 2010.

* cited by examiner

*Primary Examiner* — Lisa M Caputo
*Assistant Examiner* — Punam Roy
(74) *Attorney, Agent, or Firm* — Finnegan, Henderson, Farabow, Garrett & Dunner, LLP

(57) ABSTRACT

The present invention related to a load detecting apparatus which comprises a hollow cylindrical strain body (11) provided with, on an outer peripheral surface or an inner peripheral surface thereof, at least one strain detecting element (16, 18, 19, 20); a first member (21) fixed to an one axial end of the strain body to close an opening, and a second member (24) fixed to an other axial end of the strain body. One of the second member and the first member receives a load in a direction orthogonal to an axis of the strain body, so that a shearing force is applied to the strain body.

15 Claims, 11 Drawing Sheets

LOAD DETECTING DEVICE

This application is based on Japanese Patent Application No. 2006-243455 filed on Sep. 7, 2006, and content of which is incorporated herein by reference.

BACKGROUND OF THE INVENTION

1. Field of the Invention

The present invention relates to a load detecting apparatus used for detection of various loads, such as a depression load of the vehicle pedal and the like, a cable tension of the vehicle parking brake, and a seat load of the vehicle seat.

2. Discussion of Related Art

A conventional load detecting apparatus for the above detection has a structure shown in FIG. 9 to FIG. 11. FIG. 9 is a perspective view of the conventional load detecting apparatus, FIG. 10 is a developed view of a strain body in the above load detecting apparatus, and FIG. 11 is a circuit diagram of the above load detecting apparatus. In FIG. 9 to FIG. 11, the load detecting apparatus includes a hollow cylindrical strain body 1, a pair of circumferential strain detecting elements 2, a pair of axial strain detecting elements 3, a power source electrode 4, a GND electrode 5, an output electrode 6 and the like.

That is, on an outer peripheral surface of the hollow cylindrical strain body 1 in which strain occurs receiving the load, a pair of circumferential strain detecting elements 2 and a pair of axial strain detecting elements 3 both detecting the strain on the strain body 1 are provided. Also on the outer peripheral surface of the hollow cylindrical strain body 1, a power source electrode 4, a GND electrode 5 and an output electrode 6 are provided, which are electrically connected with the paired circumferential strain detecting elements 2 and the paired axial strain detecting elements 3 by a circuit pattern 7. Thus, a bridge circuit shown in FIG. 11 is constructed.

The conventional load detecting apparatus thus constructed is used in a state where a load (compression force) is applied to the hollow cylindrical strain body 1 parallel to an axis C thereof. That is, when the compression force is applied in parallel to the axis C of the strain body 1, the strain occurs in the deformed strain body 1, and a resistance value of the axial paired strain detecting elements 3 decreases, while a resistance value of the paired circumferential strain detecting elements 2 increases. The paired axial strain detecting elements 3 and the paired circumferential strain detecting elements 2, constructing the bridge circuit together with the power source electrode 4, the GND electrode 5, the output electrode 6 and the circuit pattern 7, outputs the output signal (voltage) corresponds to the compression force applied to the strain body 1 from the output electrode 6. As the well-known document disclosing such load detecting apparatus, a following patent document 1 (Japanese Patent Application Laid-open No. H6-2078660 can be illustrated.

However, the above load detecting apparatus has a construction such that the load is applied to the strain body 1 parallel to the axis C thereof, and accordingly a compress strain occurs in the strain body. Whereas, the hollow cylindrical strain body hardly deforms by the compression force in the direction of the axis C, so that there is a limit of magnitude of the compression strain detected. Thus, the paired axial strain detecting elements 3 and the paired circumferential strain detecting elements 2 can hardly detect the strain. As a result, sensitivity of the output signal outputted from the output electrode 6 is lowered.

The present invention is made in view of the above mentioned circumstances and therefore has an object to provide the load detecting apparatus in which the strain body can be easily deformed by the load applied thereto, so that the sensitivity of the output signal increases.

SUMMARY OF THE INVENTION

For achieving the above object, in the load detecting apparatus according to the present invention, the strain body is constructed to be deformed easier than the conventional strain body, and at least one strain detecting element is provided on the strain body to detect the strain on the strain body more securely than the conventional strain detecting element. In detail, the load detecting apparatus comprises (i) a hollow cylindrical strain body provided with, on an outer peripheral surface or an inner peripheral surface thereof, at least one strain detecting elements; (ii) a first member fixed to an one axial end of the strain body; and (iii) a second member fixed to an other axial end of the strain body; (iv) wherein the load detecting apparatus is so constructed that when one of the second member and the first member receives a load in a direction orthogonal to an axis of the strain body, a shearing force is applied to the strain body.

In the load detecting apparatus in the second aspect, the first member is provided with a shaft portion penetrating the hollow cylindrical strain body and being fixed at both axial ends thereof. In the load detecting apparatus in the third aspect, the first member is provided with a tubular sleeve penetrating the hollow cylindrical strain body, and further comprising a shaft member independent from the first member which is inserted inside the sleeve and is fixed at both axial ends thereof. In the load detecting apparatus in the fourth aspect, the strain detecting elements are provided on an all-around of the inner peripheral surface or the outer peripheral surface of the strain body.

Preferably, the first member generally has a shaft-like configuration while the second member generally has a ring-like configuration. Also, the first member includes a first support portion supporting one axial end of the strain body, and a shaft portion extending from both sides of the first support portion along the axis of the strain body. Further, the first support portion preferably supports an all-around of the one end of the strain body.

The first support portion is preferably formed integrally with the shaft portion and has a disc shape, and the shaft portion penetrates a hole of the strain body and is fixed at both axial ends thereof. Also, the first support portion includes a disc-shaped support part supporting the strain body, and a tubular fit part fitted to the shaft portion and axially slidable thereto, and the shaft portion penetrates a hole of the strain body and is fixed at both axial ends thereof.

The second member can includes a second support part supporting the other end of the strain body, and hollow portion positioned radially outside the strain body. The second support part preferably supports an all-around of the other end of the strain body. The second support part preferably opposes to the first support part or the support part of the first member in the axial direction and is radially movable relative thereto.

The plural strain detecting elements are preferably arranged on the inner peripheral surface or the outer peripheral surface in the axial direction and/or the circumferential direction of the strain body, and the plural strain detecting elements are arranged on an entire of the strain body in the circumferential direction.

According to the load detecting apparatus of the present invention, it comprises a hollow cylindrical strain body provided with, on an outer peripheral surface or an inner peripheral surface thereof, at least one strain detecting elements; a first member fixed to an one axial end of the strain body; and a second member fixed to an other axial end of the strain body; wherein the load detecting apparatus is so constructed that when one of the second member and the first member receives a load in a direction orthogonal to an axis of the strain body, a shearing force is applied to the strain body. As apparent, the both axial ends are respectively supported by the first member and the second member.

Thus, the load of the same magnitude as the conventional art applied to the hollow cylindrical strain body in the axial direction thereof, is applied to the strain body in the direction orthogonal to the axis. As a result, the strain body deforms easier and the strain occurs easier than the conventional art, which makes the strain detection by the strain detecting element easier to increases sensitivity of the output signal.

According to the load detecting apparatus of the invention in the second aspect, the first member is provided with the shaft portion which penetrates the hollow cylindrical strain body and of which both axial ends are fixed. As a result, on account of the both axial ends supporting of the first member, an inclination of the first member upon the load application is suppressed, whereby the load detecting accuracy increases.

According to the load detecting apparatus of the invention in the third aspect, the first member is provided with the tubular sleeve penetrating the hollow cylindrical strain body and further includes the shaft member which is inserted inside of the sleeve independent from the first member and is fixed at both axial ends thereof. As a result, when the load detecting apparatus is attached to a mating attachment member having a hole, after the load detecting apparatus is mounted onto a predetermined position of the mating attachment member, the shaft member can be inserted into inside the sleeve of the first member and into the hole of the mating attachment member at a time. In this way, the load detecting apparatus can be easily attached to the mating attachment member without making the structure of the mating attachment member complicated.

According to the load detecting apparatus of the invention in the fourth aspect, the strain detecting elements are provided on an all-around of the inner peripheral surface or the outer peripheral surface of the strain body. As a result, even when the load is applied to the second member at the point shifted circumferentially about the axis, any of the strain detecting elements can detect the strain, which enables accurate measurement of the load applied to the strain body.

According to the load detecting apparatus in the fifth aspect, with keeping the axial length short by inserting a part of the first member into the second member, the one end and the other end of the strain body can be supported by the first member and the second member. According to the load detecting apparatus in the sixth aspect, one end of the strain body can be suitably supported by the first support part of the first member of which shaft part is fixed. According to the load detecting apparatus in the seventh aspect, the all-around of one end of the strain body can be securely supported by the first support part.

According to the load detecting apparatus in the eight and ninth aspects, when the load detecting apparatus is attached to a first and second mating attachment members, after it is mounted onto a predetermined position of the second mating attachment member, the shaft part can be inserted into inside the fit part of the first member and into the attachment hole of the first mating attachment member at a time. In this way, the load detecting apparatus can be easily attached to the mating attachment members without making the structure of the first and second mating attachment members complicated.

According to the load detecting apparatus in the tenth aspect, the second member can support the other end of the strain body at the second part and can receive the load at the hollow part. According to the load detecting apparatus in the eleventh aspect, the all-round of the other end of the strain body can be securely supported by the second support part. According to the load detecting apparatus in the twelfth aspect, the second support part and the first support part opposed to each other can support the both ends of the strain body to apply the shearing force thereto.

According to the load detecting apparatus recited in the thirteenth and fourteenth aspect, even when the load is applied to the second member at the point shifted circumferentially about the axis, any of the strain detecting elements can detect the strain, which enables accurate measurement of the load applied to the strain body.

PREFERRED EMBODIMENT OF THE INVENTION

Hereinafter, a load detecting apparatus according to one embodiment of the present invention will be explained with reference to attached drawings.

Figure 1:
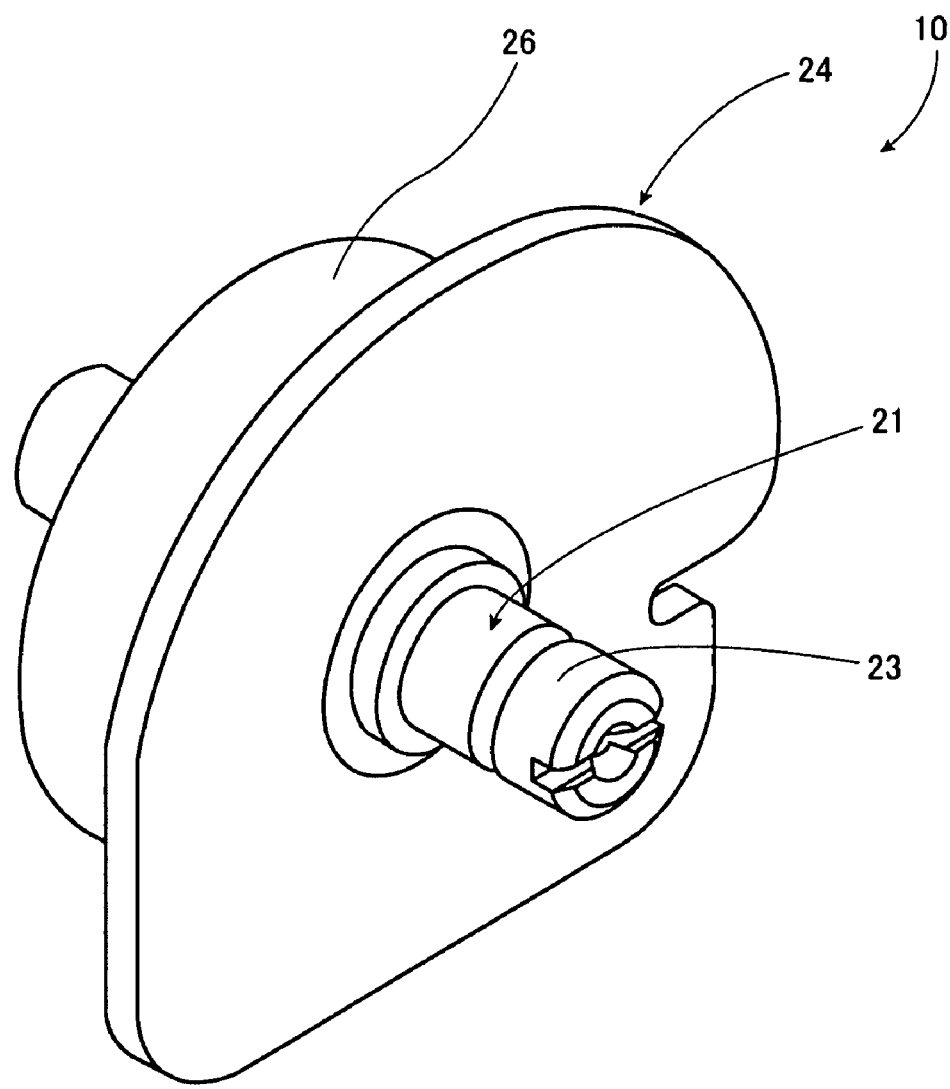
FIG. 1 is a perspective view showing a load detecting apparatus which is one example of the present invention.
Figure 2:
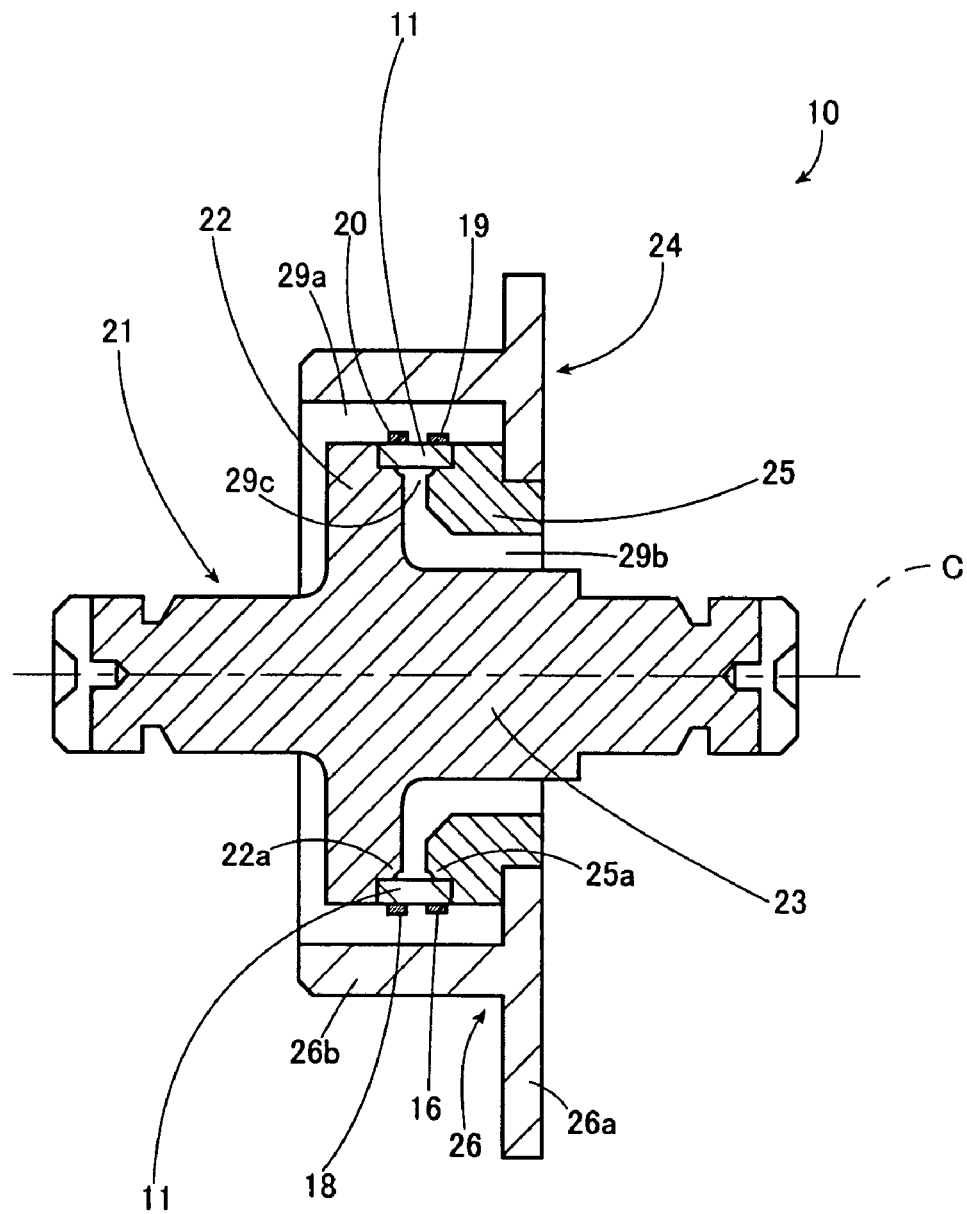
FIG. 2 is a longitudinal sectional view of the load detecting apparatus shown in FIG. 1.
Figure 3:
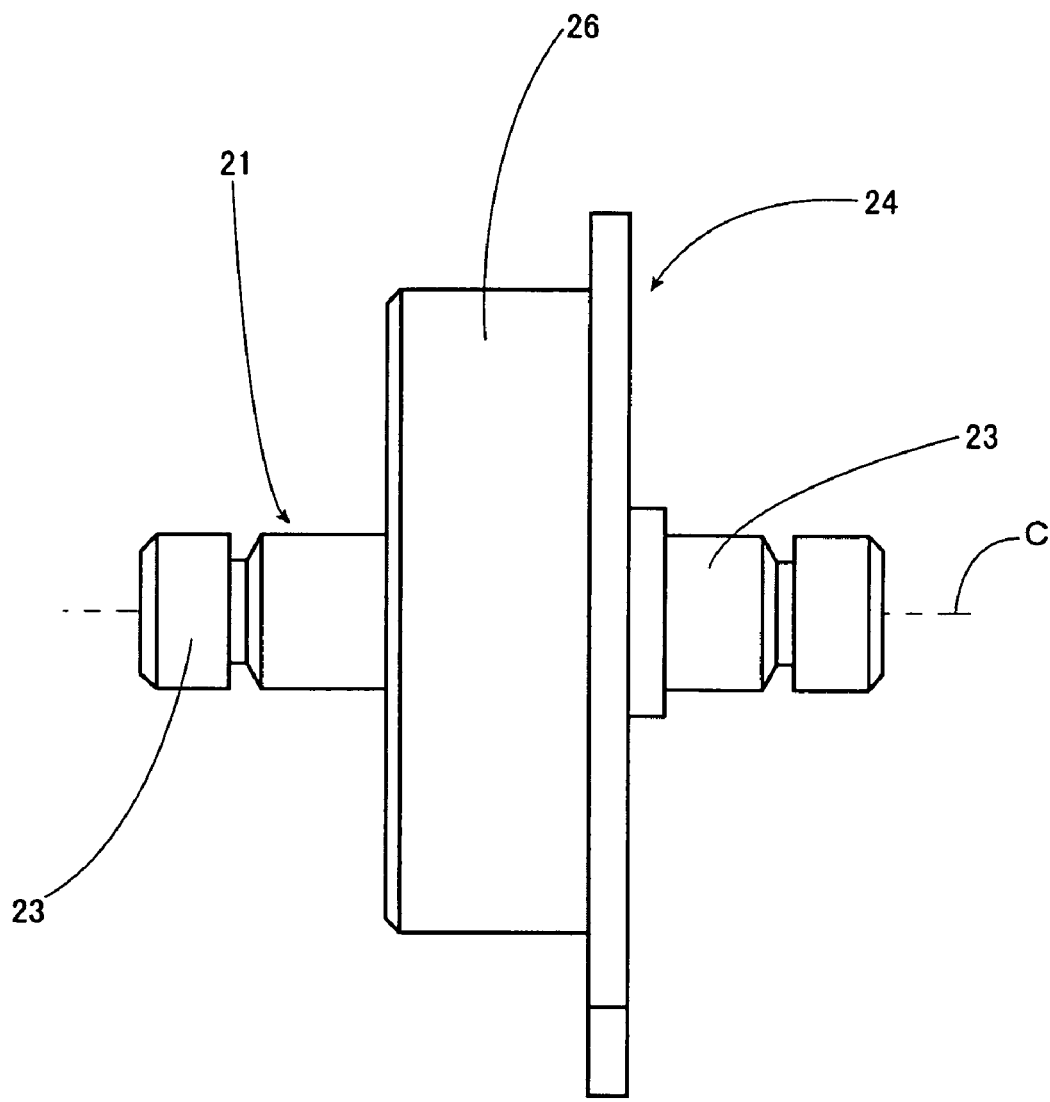
FIG. 3 is a side view of the load detecting apparatus shown in FIG. 1.
Figure 4:
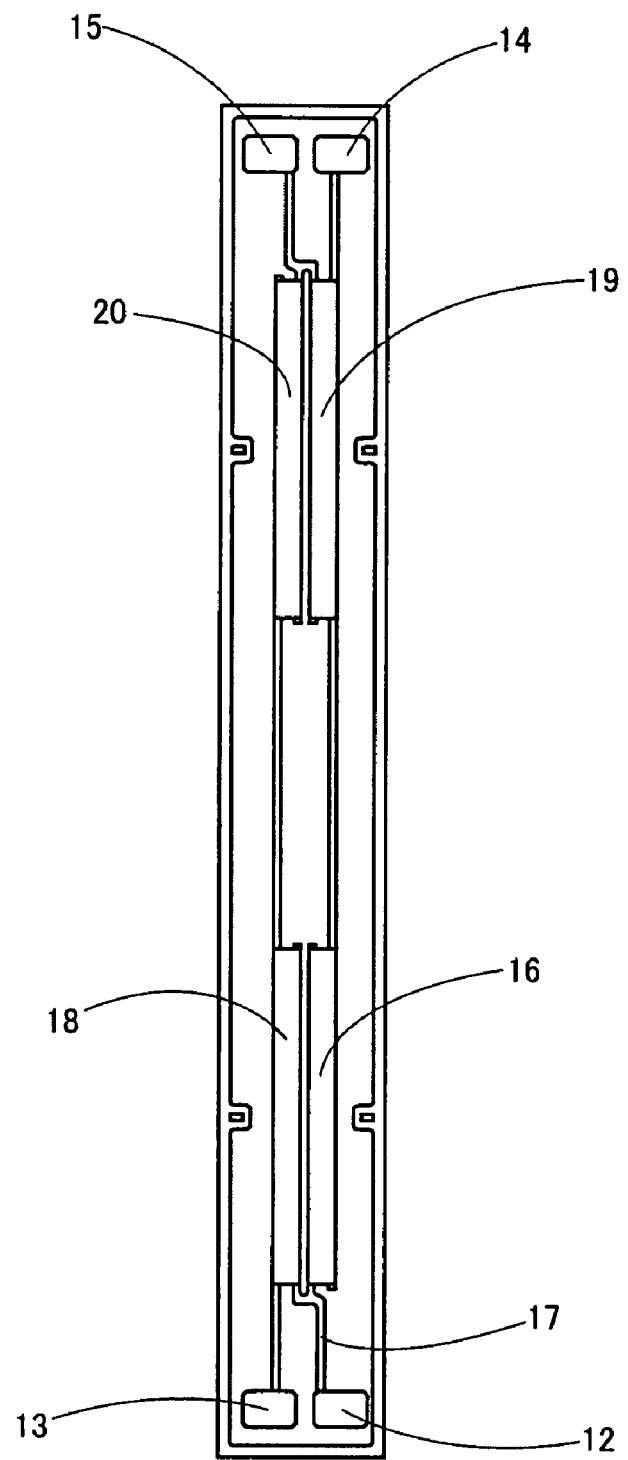
FIG. 4 is a developed view of a strain body employed in the load detecting apparatus shown in FIG. 1.
Figure 5:
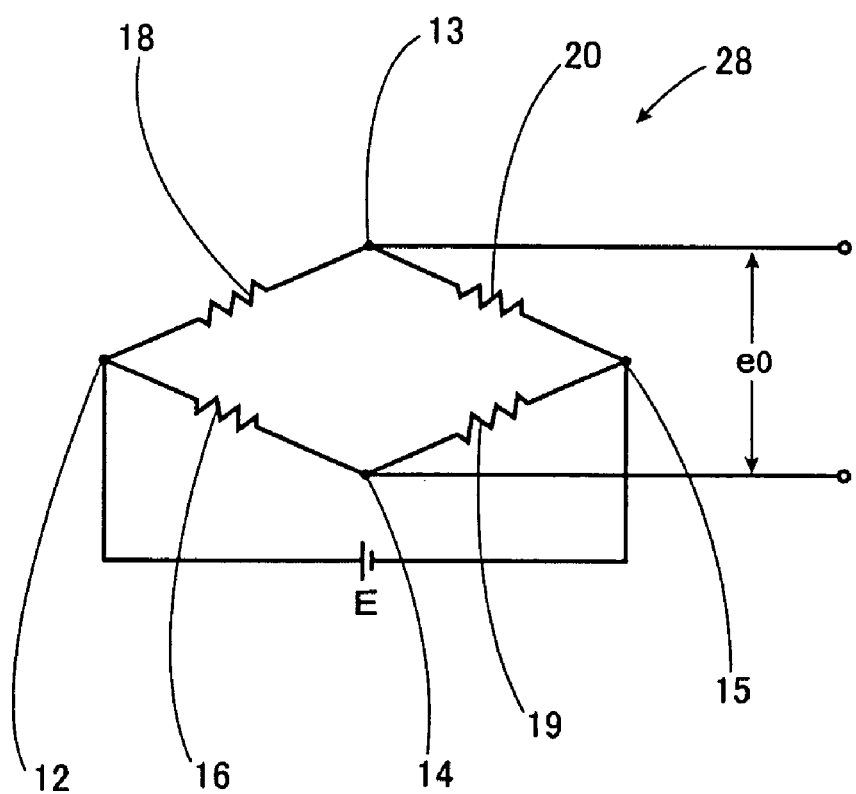
FIG. 5 is a circuit diagram of the load detecting apparatus

FIG. 1 is a perspective view showing a load detecting apparatus 10 which is one example of the present invention, FIG. 2 is a longitudinal sectional view of the load detecting apparatus 10 shown in FIG. 1, FIG. 3 is a side view of the load detecting apparatus 10 shown in FIG. 1, and FIG. 4 is a developed view of a strain body employed in the load detecting apparatus 10.

As shown in FIG. 1 to FIG. 4, the load detecting apparatus 10 includes a strain body 11 having a hollow shape, a fixing member {first member} 21 of generally shaft-like configuration, and a displacement member (second member) 24 of generally ring-like i.e., annular configuration mutually disposed coaxially. In FIG. 2 and FIG. 4, the metallic hollow cylindrical strain body 11 for example made of a ferritic stainless steel and easily deformable resiliently is disposed such that an axis C thereof directs horizontally. It has, in a longitudinal sectional view of FIG. 2, a rectangular shape which is long in the axial direction and short in the radial direction. On an outer peripheral surface of the strain body 11, a power source electrode 12, a first output electrode 13, a second output electrode 14 and a GND electrode 15 all made of a conductive material are provided adjacently.

In FIG. 4, on the outer peripheral surface of the strain body 11, four strain resistance elements 16, 18, 19 and 20 are arranged at different locations in the circumferential direction and the axial direction to construct a full bridge circuit 28. The strain resistance elements 16 etc. convert the strain to change in electric resistance and change in the electric resistance by expansion/contraction thereof. The full-bridge circuit 28 as a whole converts change ip electric resistance to change in voltage.

In detail, in FIG. 4, the strain body 11 is provided with a first strain resistance element (strain detecting element) 16 at lower part of the outer peripheral surface. One end of the first strain resistance element 16 is electrically connected to the power source electrode 12 via a circuit pattern 17, and other end thereof is electrically connected to the second output electrode 14. In FIG. 4, at the lower part of the outer peripheral surface of the strain body 11, a second strain resistance element (strain detecting element) 18 is also provided substantially parallel to the first strain resistance element 16, one end of which is electrically connected to the power source electrode 12 via the circuit pattern 17 and other end of which is electrically connected to the first output electrode 13.

In FIG. 4, the strain body 11 is provided with a third strain resistance element (strain detecting element) 19 at an upper part of the outer peripheral surface. One end of the third strain resistance element 19 is electrically connected to the first strain resistance element 16 and the second output electrode 14 via the circuit pattern 17, and other end thereof is electrically connected to the GND electrode 15. In FIG. 4, at the upper part of the outer peripheral surface of the strain body 11, a fourth strain resistance element (strain detecting element) 20 is also provided substantially parallel to the third strain resistance element 19, one end of which is electrically connected to the second strain resistance element 18 and the first output electrode 13, and other end of which is electrically connected to the GND electrode 15. Thus, a full-bridge circuit 28 is constructed.

In the axial direction of the strain body 11, the strain resistance elements 16 and 18, and the strain resistance elements 19 and 20 are adjacently arranged, while in the circumferential direction thereof, the strain resistance elements 16 and 19, and the strain resistance elements 18 and 20 are spacedly arranged.

The metallic fixing member (first member) 21 is for example made of a ferritic stainless steel, and includes a disc-shaped attachment portion 22 (first support part) and a shaft portion 23 on a longitudinally intermediate part of which the attachment portion 22 is integrally provided. An outer periphery of the attachment portion 22 engages with an end edge at one axial end of the strain body 11 by the welding such that the outer periphery 22a closes an opening of the strain body 11 at one axial end (left end in FIG. 2). One axial end (right end in FIG. 2) of the shaft portion 23 of the fixing member 21 penetrates a hollow portion of the hollow cylindrical strain body 11.

The metallic fixing member (first member) 21 is for example made of a ferritic stainless steel, and includes a disc-shaped attachment portion 22 (first support part) and a shaft portion 23 on a longitudinally intermediate part of which the attachment portion 22 is integrally provided. An outer periphery of the attachment portion 22 engages with an end edge at one axial end of the strain body 11 by the welding such that the outer periphery 22a closes an opening of the strain body 11 at one axial end (left end in FIG. 2). One axial end (right end in FIG. 2) of the shaft portion 23 of the fixing member 21 penetrates a hollow portion of the hollow cylindrical strain body 11.

The metallic displacement member (second member) 24 is for example made of a ferritic stainless steel, and includes an annular washer 25 and a generally hollow cylindrical attachment member 26 attached to one axial end of the washer 25 to function as a casing. The attachment member 26 includes a disc part 26a and a hollowed cylindrical part 26b. Radially inside the hollowed cylindrical part 26b of the attachment member 26, an outer periphery 25a of the washer (second support part) 25 engages with an open edge at other axial end (right end in FIG. 2) of the strain body 11 by the welding. Utilizing an axial gap 29c formed between the outer periphery 22a of the attachment portion 22 and the outer periphery 25a of the washer 25, the above strain body 11 is disposed.

Incidentally, the outer periphery 22a of the attachment portion 22 of the fixing member 21 is also positioned radially inside the hollowed cylindrical part 26b of the attachment member 26 to axially oppose to the outer periphery 25a. Thus, within the attachment member 26 functioning as the casing, the attachment portion 22, the strain body 11 and the washer 25 are contained.

Between an outer peripheral surface of the attachment portion 22 and an inner peripheral surface of the hollowed cylindrical part 26b a radial space 29a is formed, while between an outer peripheral surface of the shaft portion 23 and an inner peripheral surface of the washer 25 a radial space 29b is formed. As a result, the washer 25 can be radially shifted relative to the attachment portion 22 of the fixing member 21.

Between an outer peripheral surface of the attachment portion 22 and an inner peripheral surface of the hollowed cylindrical part 26b a radial space 29a is formed, while between an outer peripheral surface of the shaft portion 23 and an inner peripheral surface of the washer 25 a radial space 29b is formed. As a result, the washer 25 can be radially shifted relative to the attachment portion 22 of the fixing member 21.

In this embodiment, the load detecting apparatus 10 is used in a state where the strain body 11 and the hollowed cylindrical part 26b of the displacement member 24 receives the load applied in the direction orthogonal to the axis C. Noted is that the strain body 11 has the sectional shape of which the radial dimension is smaller than the axial dimension and which tends to easily deform by the shearing force applied radially. Accordingly, when the load is applied to the displacement member 24 orthogonal to the axis C (downward in FIG. 2) the shearing force is applied to the strain body 11. Receiving such shearing force, the strain body 11 deforms easier in the radial direction or the thickness direction than the conventional art in which the load is applied to the strain body 11 parallel to the axis C thereof. As a result, the first strain resistance element 16, the second strain resistance element 18, the third strain resistance element 19 and the fourth strain resistance element 20 easily detect the strain, whereby sensitivity of the output signal from the output electrodes 13 and 14 increases.

Next, a manufacturing process of the load detecting apparatus 10 of the one embodiment according to the present invention thus constructed will be explained.

Firstly, a glass paste (not shown) is printed on the outer peripheral surface of a hollow cylindrical seamless stainless tube (not shown) of 1 mm thickness to be formed into the strain body 11, and then it is baked at temperature of about 850 t for about 10 minutes. Next, on the outer peripheral surface of the stainless tube, a conductive paste (not shown) containing silver as a main component is printed, and then it is baked at about 850° C. for about 10 minutes. Thus, the power source electrode 12, the first output electrode 13, the second output electrode 14, the GND electrode 15 and the circuit pattern 17 are formed on the outer peripheral surface of the stainless tube.

Then, after a metal glazed base resistance paste (not shown) being printed on the outside surface, the stainless tube is dried at about 130 t for about 10 minutes, and followed by a baking of the stainless tube at about 850 t for about 10 minutes. With this, the third strain resistance element 19, the fourth strain resistance element 20, the first strain resistance element 16 and the second strain resistance element 18 are formed. Through the above processes, the stainless tube is manufactured into the strain body 11.

Next, with the shaft portion 23 of the fixing member 21 penetrating the hollow portion of the strain body 11, the attachment portion 22 is abutted onto the entire periphery of the open edge of the strain body 11 at one axial end by the welding. Subsequently, the washer 25 of the displacement member 24 is abutted onto the open edge at the other axial end of the strain body 11 by the welding. Finally, the attachment member 26 is adapted to the washer 25 and attached thereto by the welding.

Incidentally, the above printing and the baking of the stainless tube can be performed after both the attachment portion 22 of the fixing member 21 and the washer 25 are welded to each of the ends of the strain body 11.

In the following, an operation of the load detecting apparatus 10 of the one embodiment according to the present invention thus constructed and assembled will be explained.

The load detecting apparatus 10 is fixed to a first mating attachment member (not shown) at the both ends of the shaft portion 23 of the fixing member 21, and to a second mating attachment member (not shown) at the attachment portion 26a of the displacement member 24, respectively so that the axis C is directed horizontally.

Here, in the one embodiment according to the present invention, the fixing member 21 is provided with the shaft portion 23 penetrating the hollow portion of the hollow cylindrical strain body 11 and being fixed at both axial ends, which allows to support the fixing member 21 at the both axial ends thereof by the first mating attachment member.

Holding and fixing the both axial ends of the shaft portion 23 having penetrated the strain body 11 is effective to prevent occurrence of moment on the shaft portion 23. That is, compared with a case where one axial end of the strain body 11 is supported in a cantilever— fashion, occurrence of the moment resulted from the force orthogonal to the axis C and applied from the second mating attachment member to the displacement member 24 and then to the shaft portion 23 is prevented. As a result, variation of the supporting position of the shaft portion 23 by the first mating attachment member (not shown) is suppressed to avoid variation of the output signal of the full-bridge circuit 28.

Figure 6:
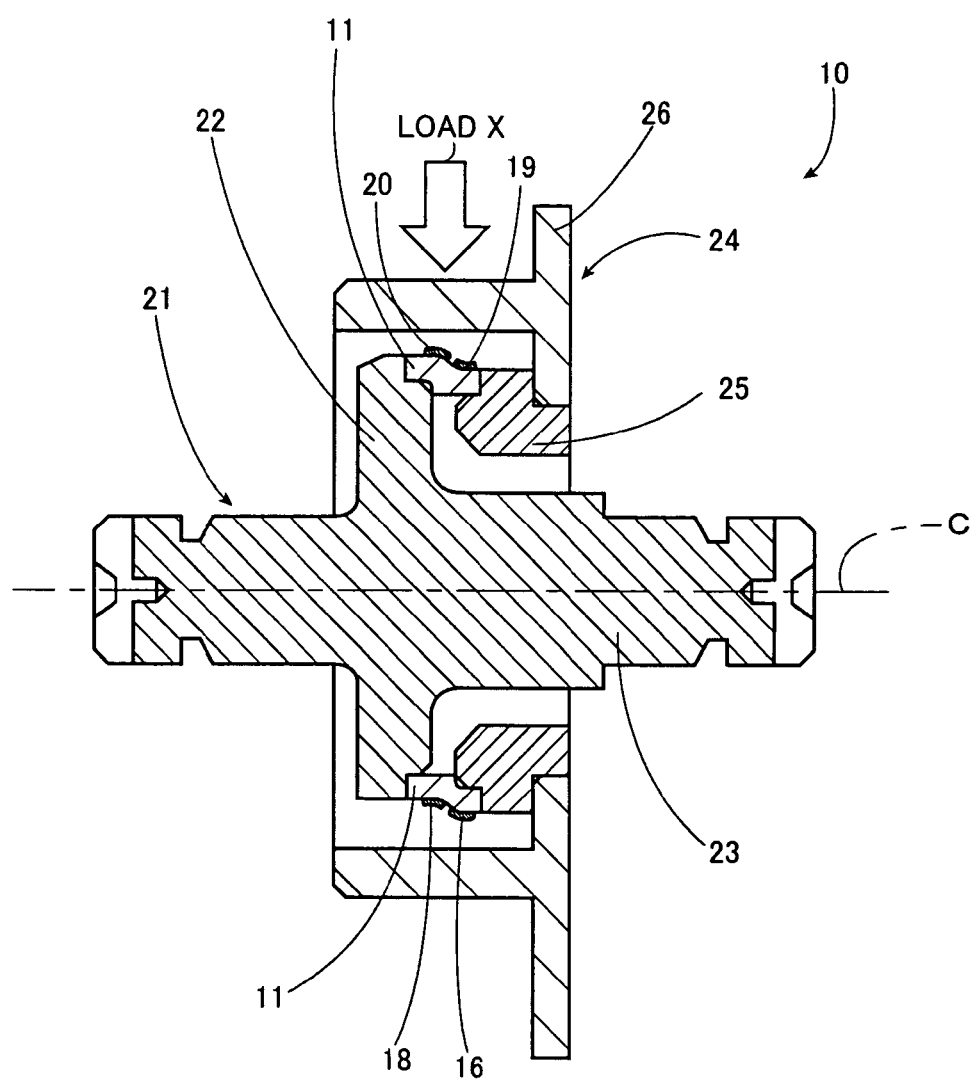
FIG. 6 is a view showing an operating state of the load detecting apparatus shown in FIG. 1.

In this state, when the load directing downward is applied, as shown by an arrow X in FIG. 6, from the second mating attachment member (not shown) to the hollowed cylindrical part 26b of the displacement member 24, the displacement member 24 i.e., the washer 25 and the attachment part 26 move downward relative to the fixing member 24 i.e., the attachment part 22. The load is applied to the strain body 11 as the shearing force. Thus, the strain (bending strain) occurs in the strain body 11 in a shearing direction, which results in that a tension stress occurs in the fourth strain resistance element 20 and the first strain resistance element 16 both receiving the tension force, while a compression stress occurs in the third strain resistance element 19 and the second strain resistance element 18 both receiving the compression force. For this reason, the resistance values of the first strain resistance element 16 and the fourth strain resistance element 20 increases, while the resistance value of the third strain resistance element 19 and the second strain resistance element 18 decreases.

With applying the voltage to the power source electrode 12 and grounding the GND electrode 15, the differential voltage between the first output electrode 13 and the second output electrode 14 is measured to determine the load applied to the strain body 11 based on a predetermined relation. Noted that in FIG. 6 strain of the strain body 11 is exaggerated for easier understanding of this embodiment.

In the following, other embodiments of the present invention will be explained. Noted is in the following explanation, the members having the same function as that in the above embodiment are added the same reference numerals and detail explanation thereof is omitted.

Figure 7:
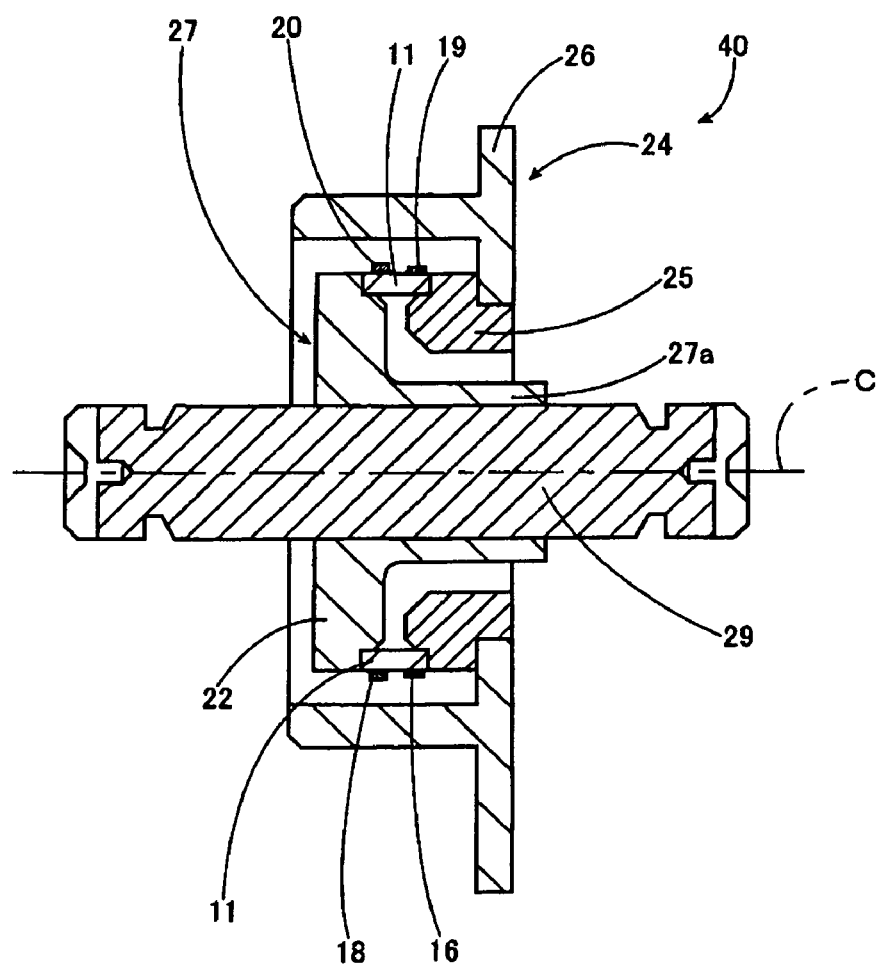
FIG. 7 is a side sectional view of the load detecting apparatus of an other embodiment of the present invention.

In the above load detecting apparatus 10, the shaft portion 23 of the fixing . member 21 which is integrally formed therewith and which penetrates the hollow cylindrical strain body 11 is fixed both axial ends thereof. However, in a load detecting apparatus 40 of an other embodiment, as shown in FIG. 7, a fixing member 27 is provided with a tubular sleeve (fit part) 27a penetrating the hollow cylindrical strain body 11. A shaft member 29 independent from the fixing member 27 is inserted fixedly or radially slidably inside the sleeve 27a, and is fixed at both axial ends thereof. Also in this case, the same advantage as that in the above embodiment can be rendered. Here, the slidable shaft member 29 increases flexibility of the supporting mechanism which supports the both axial ends, whereby the output does not vary even upon the relative movement between the shaft member 29 and the sleeve 27a.

Attachment of the load detecting apparatus 40 of FIG. 7 to the mating attachment member is considered. As explained above, the fixing member 27 is provided with the tubular sleeve 27a penetrating the hollow cylindrical strain body 11, and the shaft member 29 independent from the fixing member 27 is inserted inside the sleeve 27a to be fixed at the both axial ends thereof. For this reason, when the load detecting apparatus 40 is attached to the first and second mating attachment members, after the strain body 11, the fixing member 27 and the displacement member 24 of the load detecting apparatus 40 are mounted onto a predetermined position of the second mating attachment member, the shaft member 29 can be inserted radially inside the sleeve 27a of the fixing member 27 and into the attachment hole of the first mating attachment member at a time. With this, the load detecting apparatus 40 can be easily attached to the mating attachment member without making the construction of the first and second mating attachment members complex.

Figure 8:
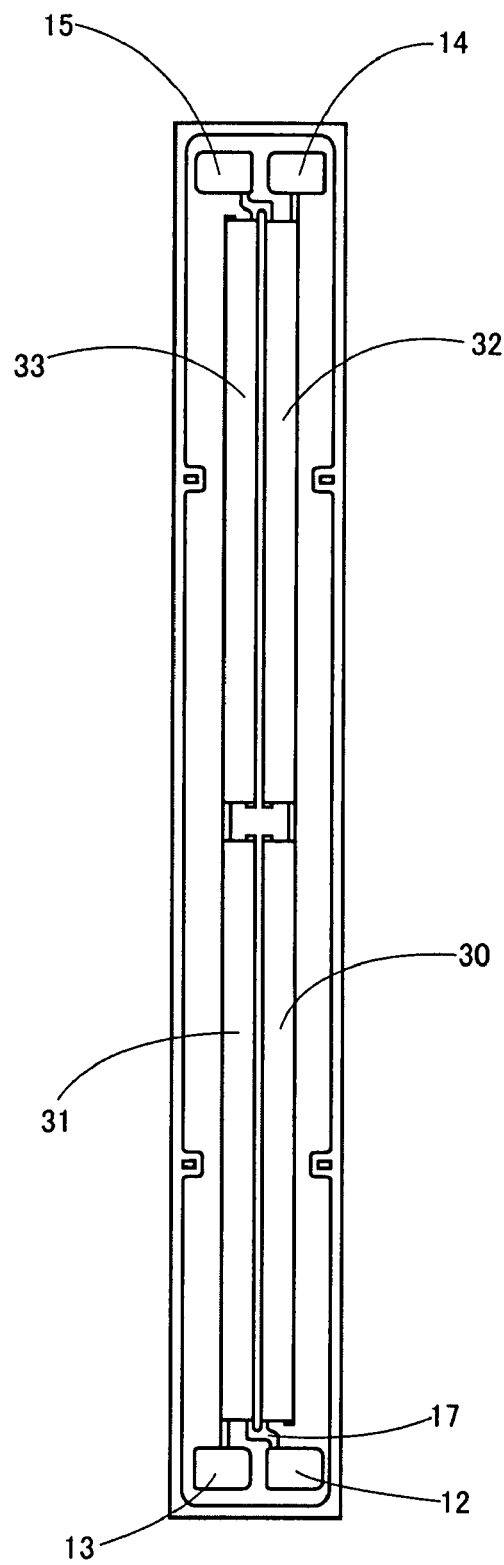
FIG. 8 is a developed view of the strain body of the load detecting apparatus employed in the other embodiment of the present invention.
Figure 9:
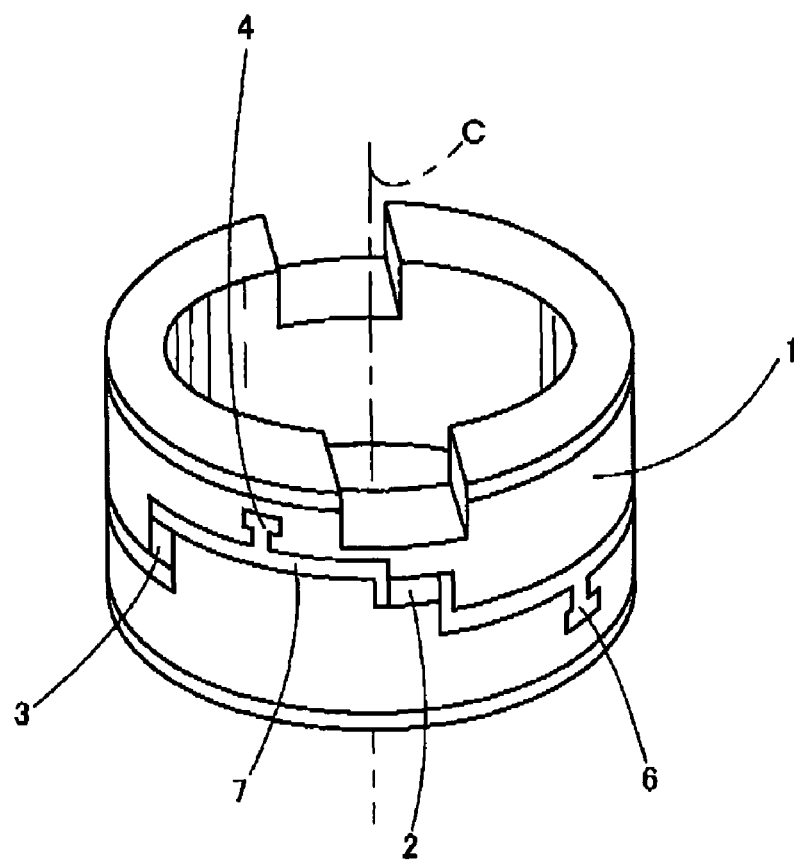
FIG. 9 is a perspective view of a conventional load detecting apparatus.
Figure 10:
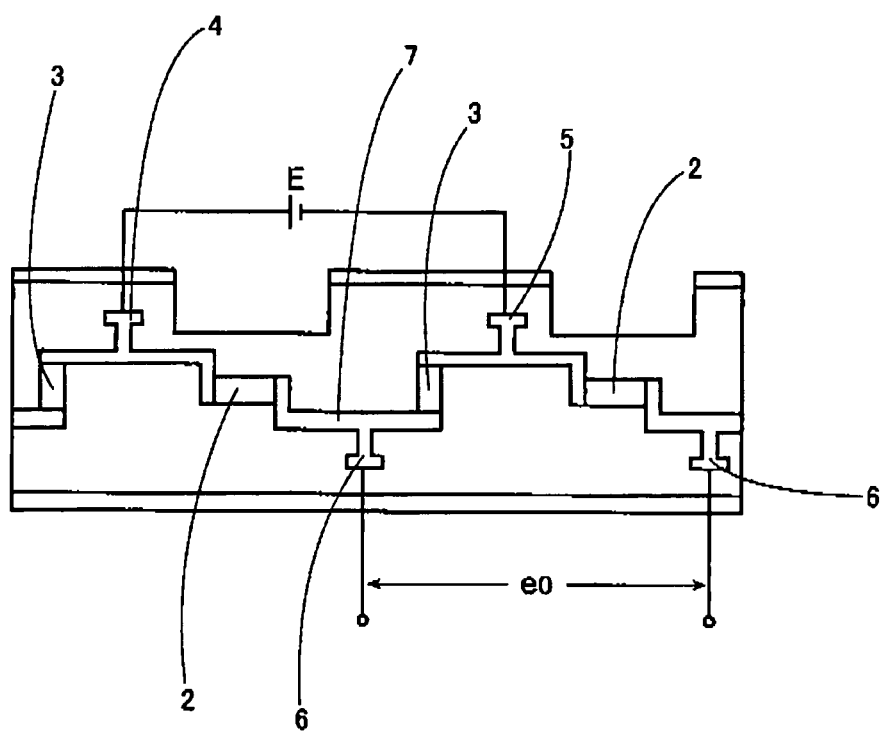
FIG. 10 is a developed view of a strain body in the above load detecting apparatus shown in FIG. 9.
Figure 11:
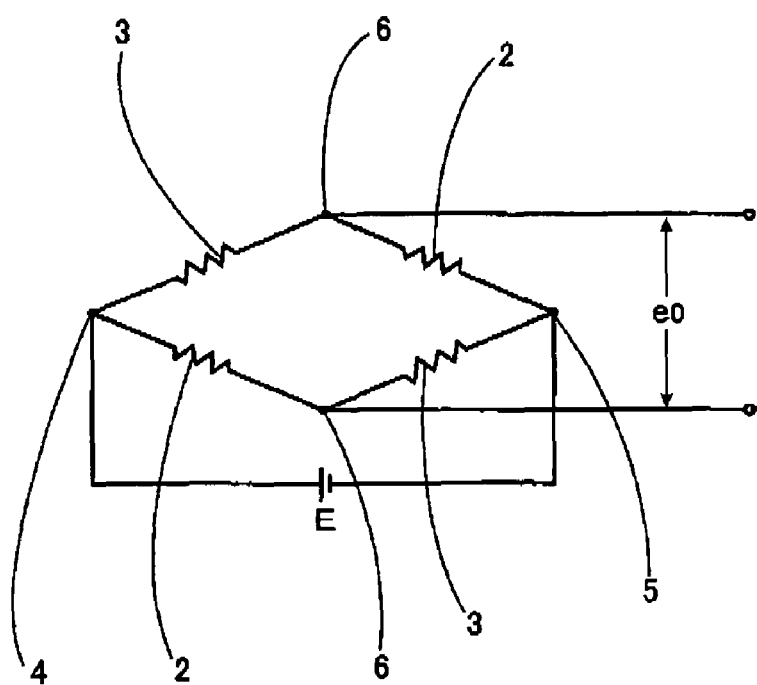
FIG. 11 is a circuit diagram of the load detecting apparatus.

In the load detecting apparatus 10 of the above embodiment, as shown in FIG. 4, the first strain resistance element 16 and the second strain resistance element 18 are circumferentially spaced from the third strain resistance element 19 and the fourth strain resistance element 20 on the outer peripheral surface of the strain body 11. However, in a still other embodiment shown in FIG. 8, a first strain resistance element 30, a second strain resistance element 31, a third strain resistance element 32 and a fourth strain resistance element 33 can be arranged on an entire outer peripheral surface of the strain body 11. According to such structure, on account of provision of the first strain resistance element 30, the second strain resistance element 31, the third strain resistance element 32 and the fourth strain resistance element 33 on substantially the entire of the outer peripheral surface of the strain body 11, the load applied to the strain body 11 can be accurately measured.

That is, even if the load directing radially inwardly toward the axis C is applied to the point circumferentially shifted from the predetermined point, any of the first strain resistance element 30, the second strain resistance element 31, the third strain resistance element 32 and the fourth strain resistance element 33 changes in the resistance value thereof. As a result, the bridge circuit 28 operates to measure the load applied to the strain body 11 securely. Incidentally, the strain resistance elements can be made of the material such as a metallic thin film.

According to the load detecting apparatus of the present invention, the strain body is easily deformed by the load applied so that the sensitivity of the output signal outputted from the output electrode 13 and 14 of the full-bridge circuit 28 increases. Particularly, the load detecting apparatus can be effectively used for detection of various loads, such as detection of a depression load of the vehicle pedal and the like, detection of a cable tension of the vehicle parking brake, and detection of a seat load of the vehicle seat.

Heretofore, some embodiments of the present invention were explained with reference to the drawings, but the present invention can be carried out in still other embodying modes as below.

For example, in the above load detecting apparatus 10 of the present invention, the power source electrode 12, the first output electrode 13, the second output electrode 14, the GND electrode 15, the circuit pattern 17 as well as the first to fourth strain resistance elements 16 to 20 are provided on the outer peripheral surface of the strain body 11. However, the power source electrode 12, the first output electrode 13, the second output electrode 14, the GND electrode 15, the circuit pattern 17 as well as the first to fourth strain resistance elements 16 to 20 can be provided on the inner peripheral surface of the strain body 11.

Also, the first to fourth strain resistance elements 16 to 20 constructing the full bridge circuit in the load detecting apparatus 10 of the present invention, can construct the half bridge circuit.

In the above load detecting apparatus 10 of the present invention, the first to fourth strain resistance elements 16 to 20 as the strain detecting element were constituted of the thick film resistors. However, the first to the fourth strain resistance elements 16 to 20 can be constituted of the thin film resistors. As the strain detecting element, a piezoelectric element and the like can be used. In conclusion, the strain detecting elements can sufficiently detect the strain and convert it to the electric signal.

In the above load detecting apparatus 10 of the present invention, the fixing member 21 and the displacement member 24 are used respectively as the first member and the second member, but the predetermined shape thereof can be modified if needed.

In the above load detecting apparatus 10 of the present invention, the strain body 11 has thickness of 1 mm, but this thickness can be modified into various values.

The above strain body 11 is constructed by the seamless stainless tube. However, it can be constructed by bonding both longitudinal ends of a rectangular stainless, or it can be formed into the tubular shape upon welding to the attachment portion 22 and the washer 25.

In addition, the present invention can be carried out in various modes, not explained one to one, which are modified or improved based on the knowledge of the skilled person in this technical field.

What is claimed is:

1. A load detecting apparatus, comprising:
a hollow cylindrical strain body provided with, on an outer continuous circumferential surface or an inner continuous circumferential surface thereof, plural strain detecting elements;
a first member fixed to an one axial end of the strain body, and passing through an inside of the hollow cylindrical strain body from a side of the one axial end toward a side of another axial end of the strain body;
a second member fixed to the another axial end of the strain body to be coaxial with the first member, and extending outside the hollow cylindrical strain body to contain the hollow cylindrical strain body; and
the load detecting apparatus constructed such that when one of the second member and the first member receives a load in a direction orthogonal to an axis of the strain body, a shearing force is applied to the strain body; and
wherein a first annular space is provided successively on the outer continuous circumferential surface of the first member at one radial side of the strain body; a second annular space is provided successively on the inner continuous circumferential surface of the second member at another radial side of the strain body such that the first annular space and the second annular space allow a relative shifting between the first member and the second member in a radial direction of the strain body.

2. A load detecting apparatus according to claim 1, wherein the first member is provided with a shaft portion passing through the inside of the hollow cylindrical strain body and having both axial ends thereof to be fixed.

3. A load detecting apparatus according to claim 1, wherein the first member is provided with a tubular sleeve passing through the inside of the hollow cylindrical strain body, and further comprising a shaft member being independent from the first member which is inserted inside the sleeve and having both axial ends thereof to be fixed.

4. A load detecting apparatus according to claim 1, wherein the plural strain detecting elements are provided on an all-around of the inner continuous circumferential surface or the outer continuous circumferential surface of the strain body.

5. A load detecting apparatus according to claim 1, wherein the first member generally has a shaft-like configuration while the second member generally has an annular configuration.

6. A load detecting apparatus according to claim 5, wherein the first member includes a first support portion supporting one axial end of the strain body, and a shaft portion extending from both sides of the first support portion along the axis of the strain body.

7. A load detecting apparatus according to claim 6, wherein the first support portion supports a periphery of the one end of the strain body.

8. A load detecting apparatus according to claim 7, wherein the first support portion is formed integrally with the shaft portion and has a disc shape, and the shaft portion passes through a hole of the strain body and has both axial ends thereof to be fixed.

9. A load detecting apparatus according to claim 7, wherein the first support portion includes a disc-shaped support part supporting the strain body, and a tubular fit part fitted to the shaft portion and axially slidable thereto, and the shaft portion passes through the hole of the strain body and has both axial ends thereof to be fixed.

10. A load detecting apparatus according to claim 6, wherein the second member includes a second support part supporting the other end of the strain body, and hollow portion positioned radially outside the strain body.

11. A load detecting apparatus according to claim 10, wherein the second support part supports a periphery of the other end of the strain body.

12. A load detecting apparatus according to claim 11, wherein the second support part opposes to the first support part of the first member and is radially movable relative thereto.

13. A load detecting apparatus according to claim 10, wherein the plural strain detecting elements are arranged on the inner continuous circumferential surface or the outer continuous circumferential surface in an axial direction and/or a circumferential direction.

14. A load detecting apparatus according to claim 13, wherein the plural strain detecting elements are arranged on an entirety of the strain body in the circumferential direction.

15. A load detecting apparatus according to claim 10, wherein the strain detecting element has an elongated shape in a circumferential direction of the strain body.

* * * * *